Nov. 25, 1952 F. C. BRAUN 2,618,901

FLORAL SPRAY

Filed Nov. 20, 1947

INVENTOR
FRANK C. BRAUN
BY
Pennie, Edmonds, Morton and Barrows
ATTORNEY

Patented Nov. 25, 1952

2,618,901

UNITED STATES PATENT OFFICE 2,618,901

FLORAL SPRAY

Frank Conrad Braun, New York, N. Y.

Application November 20, 1947, Serial No. 787,125

4 Claims. (Cl. 47—41)

1

This invention relates to floral sprays of the kind which have a foundation to which the floral material such as natural or artificial flowers, leaves, berries, or a combination of them, is applied in such a way as to give the finished floral spray the desired design and appearance.

The foundation of such floral sprays is usually made for the most part from sphagnum moss. The moss is applied to a reinforcing structure made of wood, cardboard, wire, or any other suitable material, and is tied to it with cotton twine or wire. The moss is built up until it has the required thickness and the whole foundation is given the general shape or design that the finished floral spray is to have. For instance, it may be in the shape of a cross, heart, wreath, or the like, or it may have the simple shape of a block or bar. To mount the floral material on the foundation it is wired to pointed wood sticks or pegs which are then stuck into the moss at the proper places to give the finished floral spray the desired appearance, or sprigs of some decorative material such as sprigs of laurel or some other plant are mounted on the foundation by sharpening the stems of the sprigs and sticking them directly into the moss. The foundations used by florists in making up floral sprays are usually made by manufacturers who supply them to the florists. But regardless of whether they are made and sold in this way or are made, for instance, by an artificial-wreath manufacturer as one step in the manufacture of the complete wreath, they require considerable time and care to make, and even then, they grip and support the sticks and stems of the decorative floral material none too well. Frequently it is necessary to wire the floral material to metal pegs having barbs, instead of to plain wood sticks or pegs, just so they will be gripped better by the moss and cannot be withdrawn too easily. Moreover, the sphagnum moss, which is usually used in a dry condition, causes a large amount of dust and debris which must be cleaned up both when the foundation is manufactured and when the floral material is applied to it. The moss is usually infested with bugs, ants, and other insects; and to make the foundation more sanitary, at least in outward appearance, the moss foundation is usually wrapped in wax paper or similar material.

The principal object of this invention is to provide a floral spray of the kind above described having an improved type of foundation which is sanitary and which can be made easily, quickly, and inexpensively; and into which the supporting sticks or stems of the decorative material can be easily inserted, and when so inserted, will be firmly gripped and supported.

According to the invention the floral spray has a foundation made essentially of expanded polystyrene. Expanded polystyrene is a product made by expanding polystyrene about forty times into a solidified pure white multicellular mass of foam-like material having a very low density. It is available in slabs several inches thick and varying in length and width. The slabs can be easily cut by a knife, a hot wire, or conventional woodworking equipment into smaller pieces having any desired shape. It can be firmly bonded to wood, metal and various other materials by suitable cements such as those of rubber type.

I have found that expanded polystyrene has, in addition to the above-mentioned well known properties, certain additional properties which make it ideally suited for use as the floral spray foundation. While a body of expanded polystyrene is firm and self-sustaining and has considerable structural strength, and while it is hard to the touch, nevertheless it has the property of permitting sharpened sticks or pegs to be inserted into it with surprising ease, but, nevertheless, when so inserted, they are gripped quite tenaciously and cannot be withdrawn without some effort, and, moreover, are firmly held against lateral displacement.

To make the foundation it is only necessary to cut from a slab of expanded polystyrene a piece having the general shape or design that the finished floral spray is to have. This may be easily done with a knife, the usual woodworking tools, or a hot wire. If desired, the body of expanded polystyrene may be cemented or otherwise secured to a suitable reinforcing backing, but in most cases it will have enough structural strength without any reinforcement. The floral material is applied to the foundation in the same way as heretofore, either by wiring it to sharpened sticks or pegs and inserting them into the expanded polystyrene, or inserting the stems of decorative sprigs into it.

The invention is illustrated in the accompanying drawing, in which.

Figure 1:
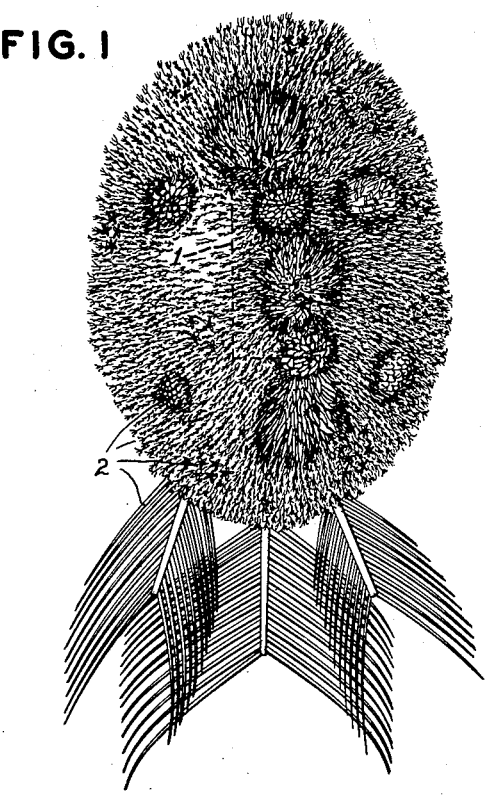
Figure 1 is a front elevation of a complete floral spray embodying the invention.

In Fig. 1 the foundation to which the floral material is applied is represented by the dotted-line rectangle 1 and the floral material itself is represented at 2.

Figure 2:
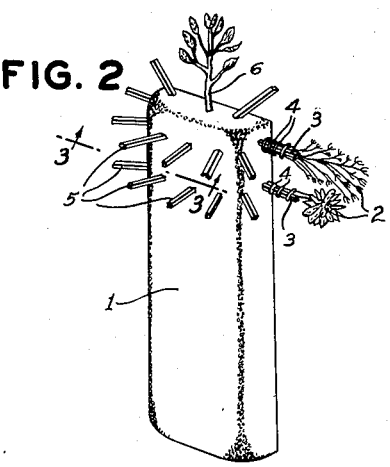
Fig. 2 is a perspective view, drawn to a larger scale, of an expanded polystyrene foundation of the block or bar type to which the floral material is applied to produce a floral spray of the kind shown in Fig. 1.

Fig. 2 shows in perspective a foundation of the block or bar type suitable for use in making the kind of floral spray shown in Fig. 1, and also illustrates the manner in which the floral material is applied to it. As above stated, the foundation comprises a body of expanded polystyrene which is cut from a slab, and preferably the forward edges and corners are rounded. The floral material 2 is wired or tied to wood sticks, or pegs 3, as indicated at 4, which are then inserted into the expanded polystyrene sufficiently far to cause them to be firmly held by it. If conditions permit, the sticks can be inserted first into the expanded polystyrene as shown at 5 and the floral material thereafter wired or tied to them. At 6 there is represented a sprig of some decorative floral material, the stem of which has been sharpened and inserted directly into the expanded polystyrene. In this case the stem of the sprig constitutes the supporting stick for the decorative portion of the floral sprig. It is to be understood of course that the floral material is applied over the entire body of expanded polystyrene in this manner, except its rear face, until it is entirely hidden by the floral material and until the floral spray has the desired final appearance and design.

Figure 3:
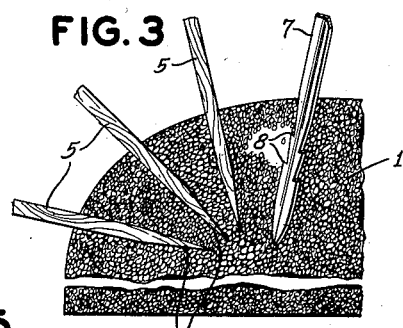
Fig. 3 is a partial transverse section taken on the line 3—3 of Fig. 2 drawn to a still larger scale.

The ends of the sticks, or pegs 5, are tapered as shown at 6 in Fig. 3 to facilitate their insertion into the expanded polystyrene. The use of sticks having tapered ends also causes the expanded polystyrene gradually to be spread apart as the sticks are inserted into it, with the result that the material adjacent the sticks is compressed and in tending to return to its original expanded state tenaciously grips the sticks and firmly holds them in the body of expanded polystyrene. On the other hand, when a blunt stick is forced into the expanded polystyrene the edges of the stick at the blunt end exert a shearing action which in effect cuts a plug of polystyrene from the body thereof which is forced by the blunt end of the stick into the body ahead of it, with the result that there is no appreciable compression of the expanded polystyrene adjacent the stick and it is not firmly gripped and held in its inserted position. One of the pegs shown in Fig. 3, namely, the one designated 7, is a metal peg having barbs 8. As above stated, this type of peg is advantageous when the foundation is made of moss but its use is really not necessary when the foundation is made of expanded polystyrene, although they may be used of course if desired. This invention makes possible the use of the much less expensive simple wood sticks due to the expanded polystyrene's peculiar ability to grip the pegs rather tenaciously after they are inserted in it despite the fact that the expanded polystyrene offers so little resistance to penetration by the pegs.

Fig. 3 also shows one advantage of rounding the forward corners and edges of the body of expanded polystyrene. This permits the sticks or pegs to be inserted at the edge and corner portions of the body of expanded polystyrene in a more evenly distributed manner than if the corners and edges were sharp, thus making it possible to give a more even distribution to the floral material supported by the sticks.

Figure 4:
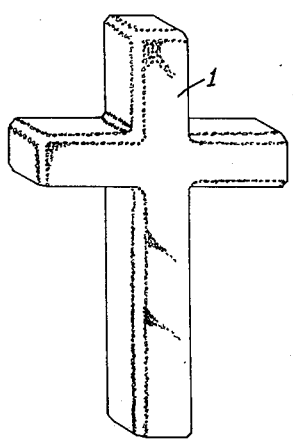
Figs. 4–6 are perspective views illustrative of the various shapes or designs which may be given to the expanded polystyrene foundation.
Figure 5:
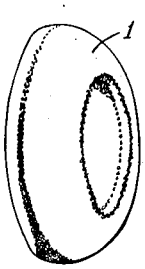
Figure 6:
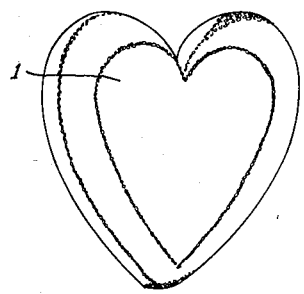

Figs. 4–6 illustrate how the body of expanded polystyrene employed for the foundation can be cut to any desired shape or design depending upon the intended design of the completed floral spray. In Fig. 4 the expanded polystyrene foundation is in the shape of a cross. In Fig. 5 it has an annular shape which adapts it for use in wreath-making, and in Fig. 6 it has the shape of a heart.

Figure 7:
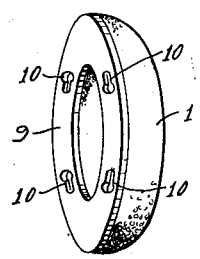
Fig. 7 is a perspective view of an expanded polystyrene foundation having a reinforcing backing.

In most cases the body of expanded polystyrene will have sufficient strength to require no reinforcement of any kind but if not it may be secured to any suitable reinforcing frame as illustrated in Fig. 7. In this figure the body of expanded polystyrene has an annular shape and the reinforcing frame is a backing ring of cardboard or other suitable material shown at 9. The expanded polystyrene may be secured to the reinforcing backing in any suitable way, as by means of a rubber-type adhesive. If desired, the reinforcing backing may have a number of openings 10 by means of which the floral spray can be attached to a suitable support. Preferably the openings 10 are the bayonet-slot type so that the large portions of the openings can be inserted over the heads of properly positioned suction cups or other attaching devices and then the foundation given a partial revolution to lock it in position.

It will now be seen that the improved floral spray above described has a foundation which is sanitary and can be very easily and quickly made even by a florist, and permits easy and quick application of the floral material to it and firmly holds the floral material in place after it is applied.

The term "floral spray" as used herein and in the appended claims means the completed floral piece regardless of its shape and is intended to include wreaths, the term "floral material" is used in its broad sense to include leaves and other types of foliage, and berries, as well as flowers, whether natural or artificial, and the term "sticks," unless otherwise specifically designated, includes either separate supporting elements for the floral material or the ends of stems of the floral material.

I claim:

1. A foundation for floral material comprising a body of expanded polystyrene, and a plurality of sticks inserted partly into the expanded polystyrene and projecting therefrom, the ends of the sticks within the expanded polystyrene being tapered and the polystyrene adjacent the portions of the sticks therein being compressed as a result of the insertion of the sticks into it and exerting a gripping force against the sticks which tenaciously holds them against withdrawal, the expanded polystyrene also firmly supporting the sticks against lateral displacement.

2. A floral spray including a foundation comprising a body of expanded polystyrene, a plurality of sticks inserted partly into the expanded polystyrene and projecting therefrom, the ends of the sticks within the expanded polystyrene being tapered and the polystyrene adjacent the portion of the sticks therein being compressed as a result of the insertion of the sticks into it and exerting a gripping force against the sticks which tenaciously holds them against withdrawal, and floral material secured to the projecting portions of the sticks, the expanded polystyrene firmly supporting the sticks and the floral material against lateral displacement.

3. A floral spray as set forth in claim 2 in which the body of expanded polystyrene has the general shape of the finished spray.

4. A foundation for floral material as set forth in claim 1 in which a reinforcing frame is provided for the body of expanded polystyrene.

FRANK CONRAD BRAUN.

REFERENCES CITED

The following references are of record in the file of this patent:

UNITED STATES PATENTS

| Number | Name | Date |
|---|---|---|
| 79,122 | Hochbrunn | June 23, 1868 |
| 284,745 | LeMoult | Sept. 11, 1883 |
| 1,657,750 | Hanson | Jan. 31, 1928 |
| 2,023,204 | Munters | Dec. 3, 1935 |
| 2,275,164 | Thomas et al. | Mar. 3, 1942 |
| 2,278,773 | Erdmann | Apr. 7, 1942 |
| 2,366,377 | Zois | Jan. 2, 1945 |
| 2,409,910 | Stober | Oct. 22, 1946 |
| 2,416,136 | Arlington | Feb. 18, 1947 |

OTHER REFERENCES

Publication, 1946, Modern Plastics Encyclopedia, pages 243–244.